United States Patent [19]
Ouellette

[11] Patent Number: 5,096,369
[45] Date of Patent: Mar. 17, 1992

[54] PALLET INSPECTION AND STACKING APPARATUS

[75] Inventor: Joseph F. Ouellette, Glendale, Mo.

[73] Assignee: Ouellette Machinery Systems, Inc., Fenton, Mo.

[21] Appl. No.: 108,493

[22] Filed: Oct. 14, 1987

[51] Int. Cl.⁵ .................................. B65G 61/00
[52] U.S. Cl. .......................... 414/788.7; 414/763; 414/783; 414/796.4; 414/929
[58] Field of Search ............... 414/32, 33, 45, 51, 414/82, 101, 113, 118, 119, 120, 763, 783, 928, 929, 788.5, 788.7, 795.7, 796.4; 198/403; 209/702, 705, 942; 29/772

[56] References Cited

U.S. PATENT DOCUMENTS

| | | | |
|---|---|---|---|
| 2,497,149 | 2/1950 | Berdis et al. | 414/51 X |
| 2,652,140 | 9/1953 | Hall | 198/403 X |
| 3,380,570 | 4/1968 | Jordan | 198/403 |
| 3,758,365 | 9/1973 | Schilling | 414/763 X |
| 3,780,884 | 12/1973 | Jones | 414/118 |
| 3,815,762 | 6/1974 | Hoke et al. | 414/114 |
| 3,987,911 | 10/1976 | Euverard et al. | 414/113 |
| 4,305,692 | 12/1981 | Brauer | 414/763 X |
| 4,490,090 | 12/1984 | St. Clair | 414/567 |
| 4,557,656 | 12/1985 | Ouellette | 414/101 X |
| 4,624,616 | 11/1986 | Freese | 414/113 X |
| 4,743,154 | 5/1988 | James et al. | 414/33 |

FOREIGN PATENT DOCUMENTS

| | | | |
|---|---|---|---|
| 1502861 | 10/1967 | France | 414/51 |
| 969527 | 9/1964 | United Kingdom | 414/69 |
| 2056681 | 3/1981 | United Kingdom | 209/903 |

*Primary Examiner*—Robert J. Spar
*Assistant Examiner*—Janice Krizek
*Attorney, Agent, or Firm*—Rogers, Howell & Haferkamp

[57] ABSTRACT

A pallet inspection and stacking apparatus having a frame with an upper end. An elevator can index a stack of pallets upwardly in the frame as the uppermost pallet from the stack is subject to an automatic alignment mechanism and then is transferred from the stack to a transversely located inspection mechanism. The inspection mechanism grips the side edges of the pallet and rotates the pallet for inspection purposes. A rejected pallet can be released from the inspection mechanism and deposited on another elevator that is indexed downwardly as rejected pallets are stacked on it until the rejected stack is removed by a conveyor. Accepted pallets are transferred from the inspection mechanism to an outfeed bay where the pallets are gripped and sequentially deposited on an elevator which is indexed downwardly as the stack grows.

17 Claims, 9 Drawing Sheets

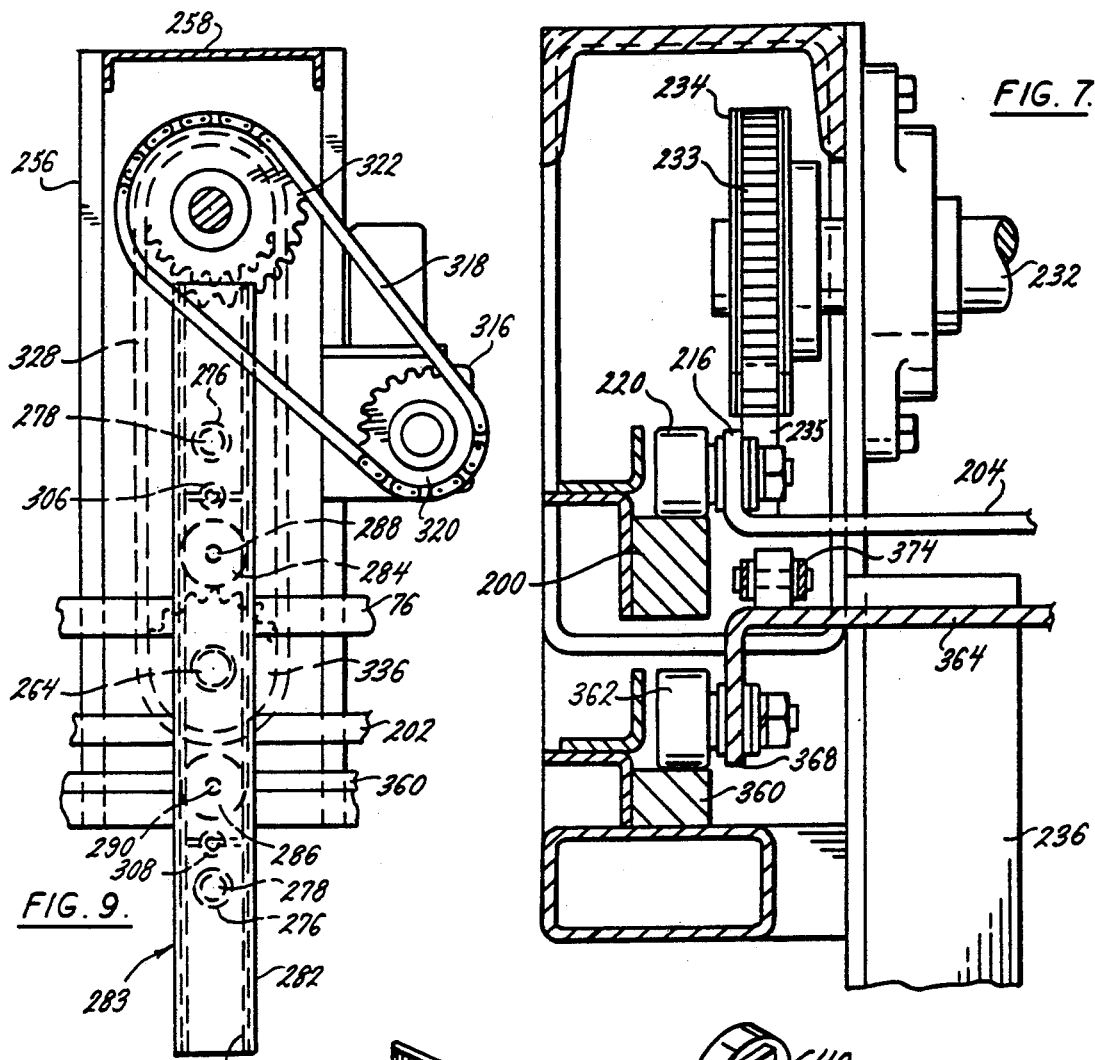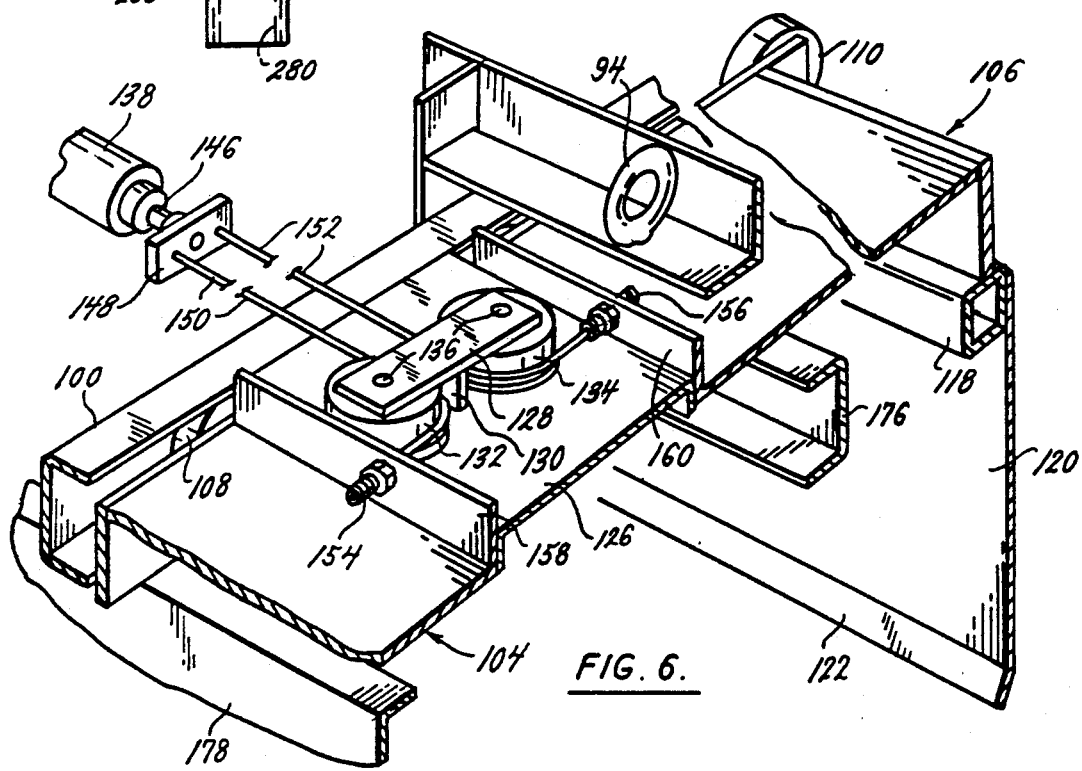

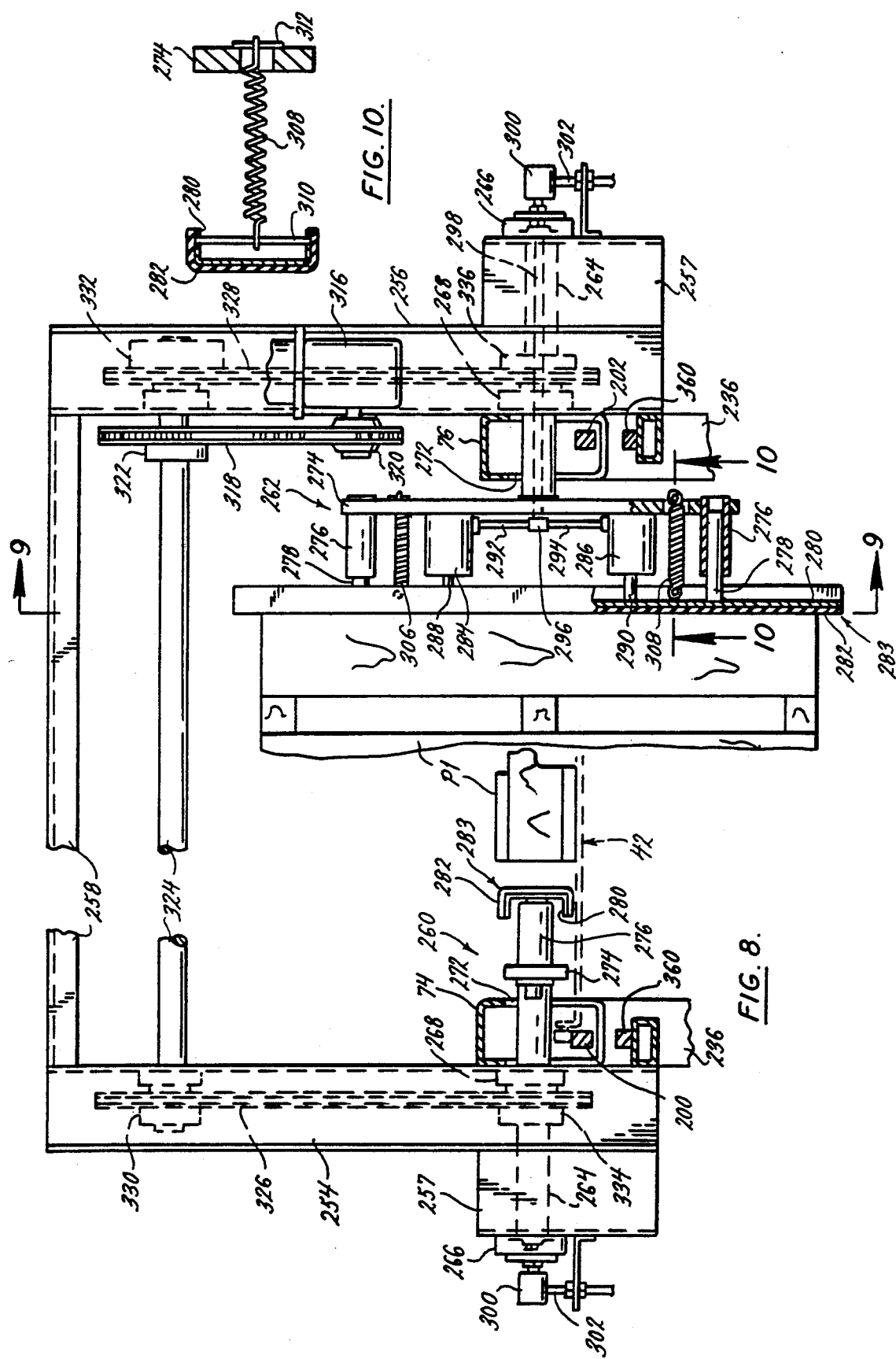

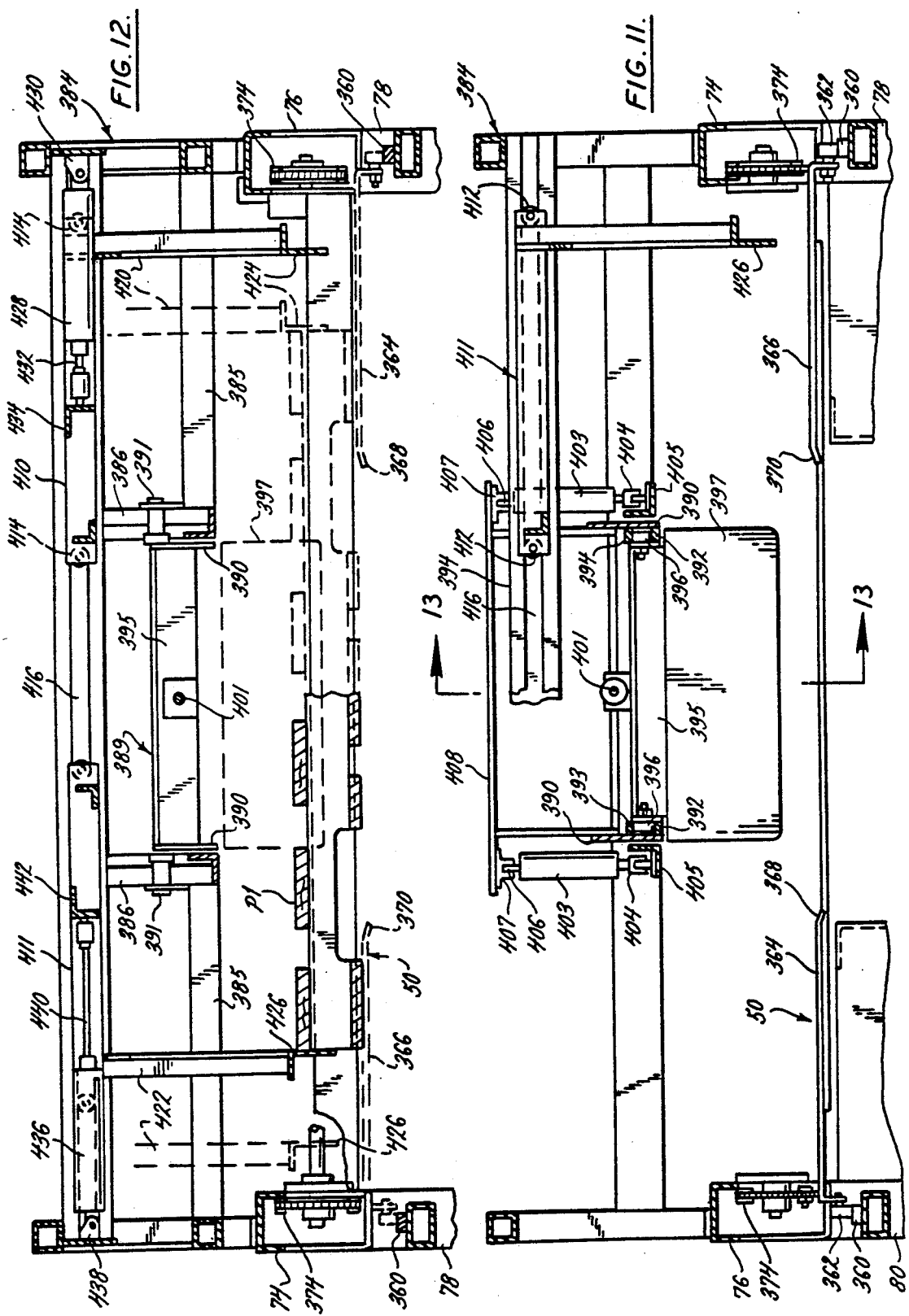

PALLET INSPECTION AND STACKING APPARATUS

BACKGROUND AND SUMMARY OF THE INVENTION

This invention relates to apparatus for the inspection of pallets and for aligning a stack of pallets in a substantially continuous operation.

Ouellette Pat. No. 4,557,656 illustrates and describes apparatus for handling pallets, operable either in a palletizing or depalletizing mode and its subject matter is incorporated herein by reference. The present invention, like the aforementioned Pat. No. 4,557,656, incorporates a system of elevators for delivering pallets to and from the upper area of a frame where the pallets can be transferred and handled for either or both the functions of pallet inspection and alignment of a stack of pallets.

In the present invention, the apparatus incorporates a frame having an infeed bay, an inspection bay, and an outfeed bay located adjacent one another. Each bay has an independent elevator. Thus, the infeed bay receives a stack of pallets from a conveyor and an elevator raises the pallets within the infeed bay. The elevator is indexed upwardly as pallets are removed from the top of the stack.

At the top of the infeed bay, there are transversely movable plates for engaging the side edges of an uppermost pallet on the stack. These plates are biased inwardly by a pneumatic or hydraulic piston and cylinder assembly connected between the plates. If the uppermost pallet is askew relative to the plates, the pressure applied by the plates initially pivots that uppermost pallet into alignment with the plates after which the plates firmly grip the pallet. Because the piston and cylinder assembly floats with the positions of the plates, the plates will not center the pallet relative to the frame at this time. Rather, the elevator will lower the pallet stack to create a small gap (about ½ inch) between the top of the stack and the pallet gripped between the plates. Thereafter, with interference between the gripped pallet and the stack eliminated, another piston and cylinder assembly having chains connected to both plates aligns the gripped pallet with the longitudinal center of the frame. A transversely movable pallet car assembly at the upper end of the frame then receives the aligned pallet, upon release by the plates, and a pusher plate properly locates the longitudinal position of the pallet on the pallet car assembly. Thereafter, the pallet car assembly transfers the pallet from the top of the infeed bay to the top of the inspection bay.

At the inspection bay, there are gripper arms that grip the pallet at its side edges and rotate the pallet through increments of 180° each. The top of the pallet can first be visually inspected and then, upon the first 180° increment of rotation, the bottom of the pallet can be inspected. The elevator in the inspection bay is for receiving a rejected pallet. If the operator determines that a pallet should be rejected, he initiates operation of the reject cycle, such as by depressing a button, so that the grippers will separate and drop the pallet onto the inspection bay elevator. The rejected pallets are stacked on the inspection bay elevator and the elevator is indexed downwardly as pallets are stacked on it. These rejected pallets are transferred to a conveyor that removes them from the apparatus.

If a pallet is not to be rejected, the inspection mechanism rotates it through the second 180° increment and releases the pallet onto another pallet car assembly. This pallet car assembly transfers the pallet from the inspection bay to the outfeed bay. A pusher plate is swung downwardly to a position behind the pallet and is actuated to push the pallet against a stop, thereby positioning the pallet for alignment in a stack of pallets on the outfeed elevator.

In the outfeed bay, there are gripper arms for holding the pallet while the pallet car assembly leaves the outfeed bay and returns to the inspection bay. The gripper arms then release the pallet onto the outfeed bay elevator. As pallets are deposited on the outfeed bay elevator, the elevator is indexed downwardly. When the elevator has a full stack of pallets, it transfers the pallets to a conveyor assembly for removal of the stack.

For alignment of a stack of pallets without inspection of the pallets, the apparatus can be operated in the foregoing manner except rotation of the inspection mechanism is deactivated.

DESCRIPTION OF THE DRAWINGS

FIG. 6 is a partial perspective view of the control mechanism for the alignment plates;

FIG. 7 is an enlarged view in section taken along the plane of the line 7—7 of FIG. 2;

FIG. 8 is an enlarged view in section taken along the plane of the line 8—8 of FIG. 2 and with parts broken away and showing one pneumatic gripper assembly rotated ninety degrees for illustrative purposes;

FIG. 9 is a view in section taken along the plane of the line 9—9 of FIG. 8;

FIG. 10 is an enlarged view in section taken along the plane of the line 10—10 of FIG. 8;

FIG. 11 is an enlarged view in section taken along the plane of the line 11—11 of FIG. 1;

FIG. 12 is an enlarged view in section taken along the plane of the line 12—12 of FIG. 2;

FIG. 14 is a view in section taken along the plane of the line 14—14 of FIG. 2;

FIG. 15 is a view in section taken along the plane of the line 15—15 of FIG. 2; and FIG. 16 is a view in section taken along the plane of the line 16—16 of FIG. 2.

DETAILED DESCRIPTION OF THE PREFERRED EMBODIMENT

Figure 1:
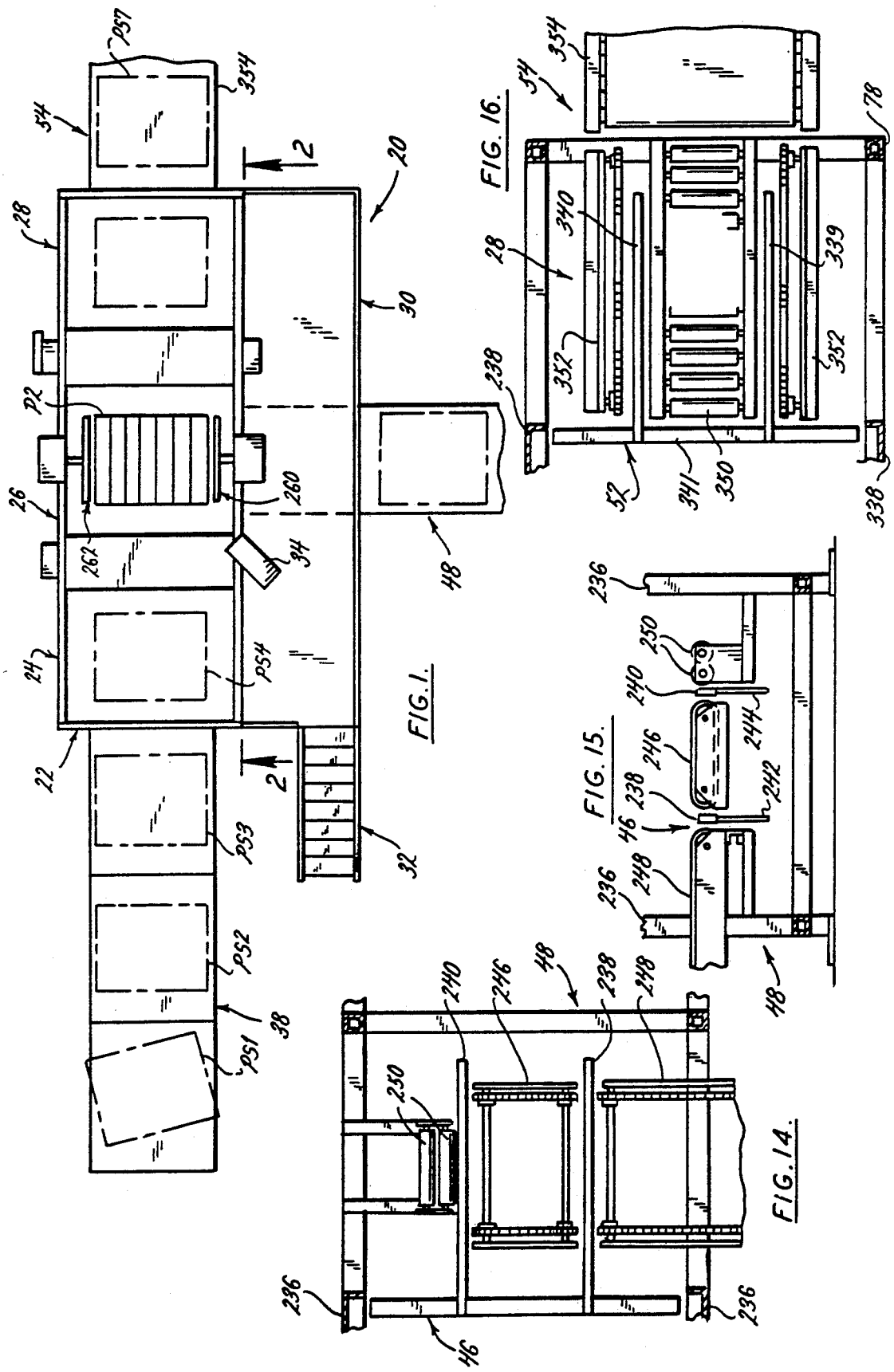
FIG. 1 is a top plan view of the pallet inspection and stacking apparatus shown installed with a conveyor system.

This pallet inspection and stacking apparatus 20 has a frame 22 that forms a vertical infeed bay 24, a vertical inspection bay 26, and a vertical outfeed bay 28. Alongside these bays 24, 26, and 28, an elevated operator's platform 30 is supported by the frame 22, and is reached by steps 32. Various controls 34 are accessible from the operator's platform 30.

An infeed conveyor system 38 transfers stacks of pallets, such as pallet stacks PS1, PS2 and PS3 to the infeed bay 24. An elevator 40 raises the leading pallet stack, such as the pallet stack PS4, to a position at the top of the infeed bay 24 where a pallet transfer car assembly 42 can receive the uppermost pallet from the stack PS4. An alignment and centering plate assembly 44 initially grips an uppermost pallet and then aligns and centers that uppermost pallet before depositing it onto the pallet transfer car assembly.

The pallet transfer car assembly 42 can transfer the uppermost pallet from the infeed bay 24 to the inspection bay 26 where the pallet is handled by a pallet gripping and holding system 45 enabling inspection of the pallet. Any rejected pallets are deposited on an elevator 46 in the inspection bay 26. The elevator 46 lowers a stack of rejected pallets PS5 to a conveyor system 48. Pallets that are not rejected are carried from the inspection bay 26 to the outfeed bay 28 by a pallet transfer car assembly 50. These pallets are successively stacked on an elevator 52 that lowers the resulting pallet stack PS6 to an outfeed conveyor system 54.

This pallet inspection and stacking apparatus will now be described in more detail. For the infeed bay 24, the frame 22 has vertical columns 58 that support the elevator 40. The elevator 40 may be operated by a motor-driven chain (not shown) such as the kind illustrated and described in U.S. Pat. No. 4,557,656.

Figure 2:
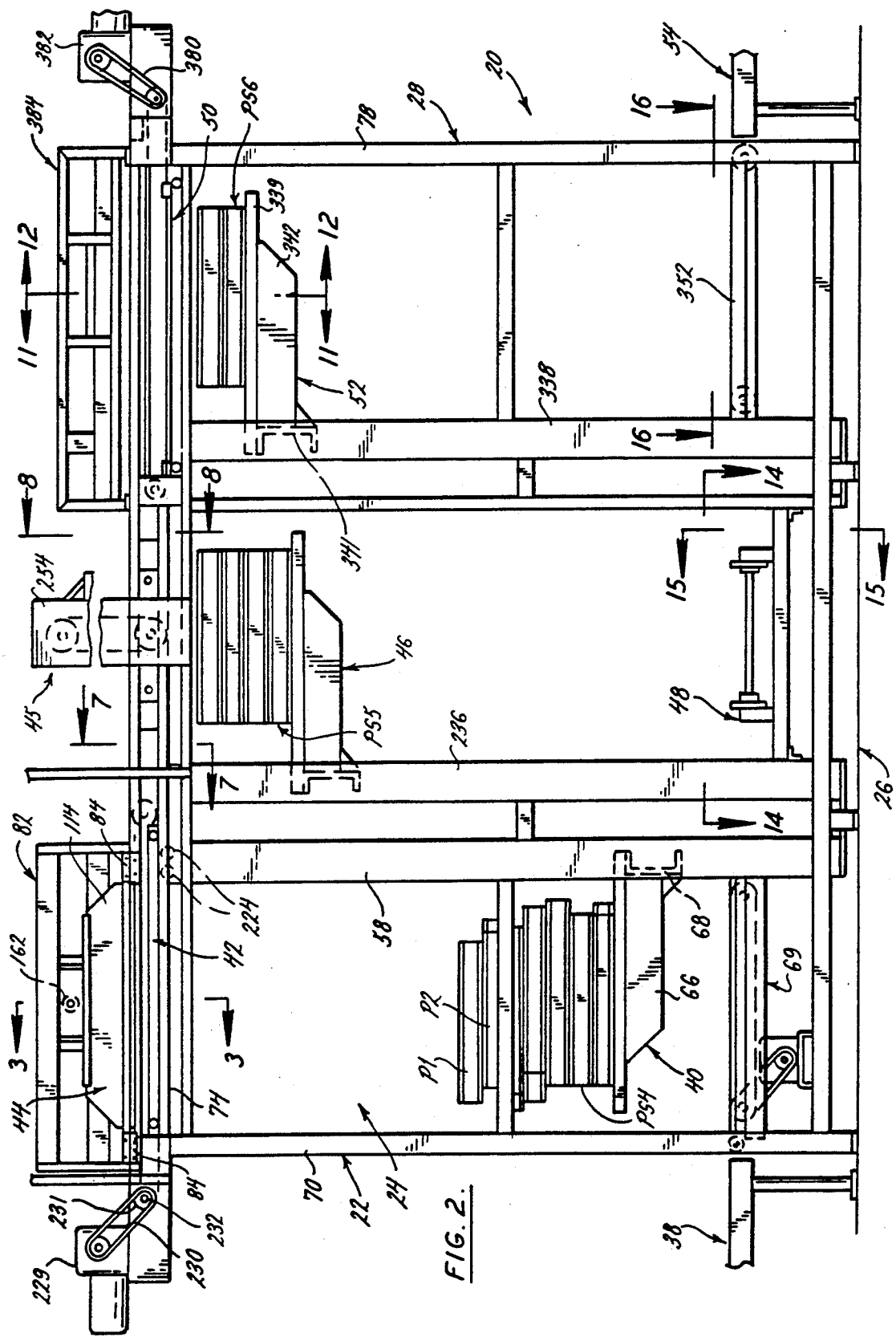
FIG. 2 is an enlarged side elevation view of the pallet inspection and stacking apparatus as viewed along the line 2—2 of FIG. 1.
Figure 3:
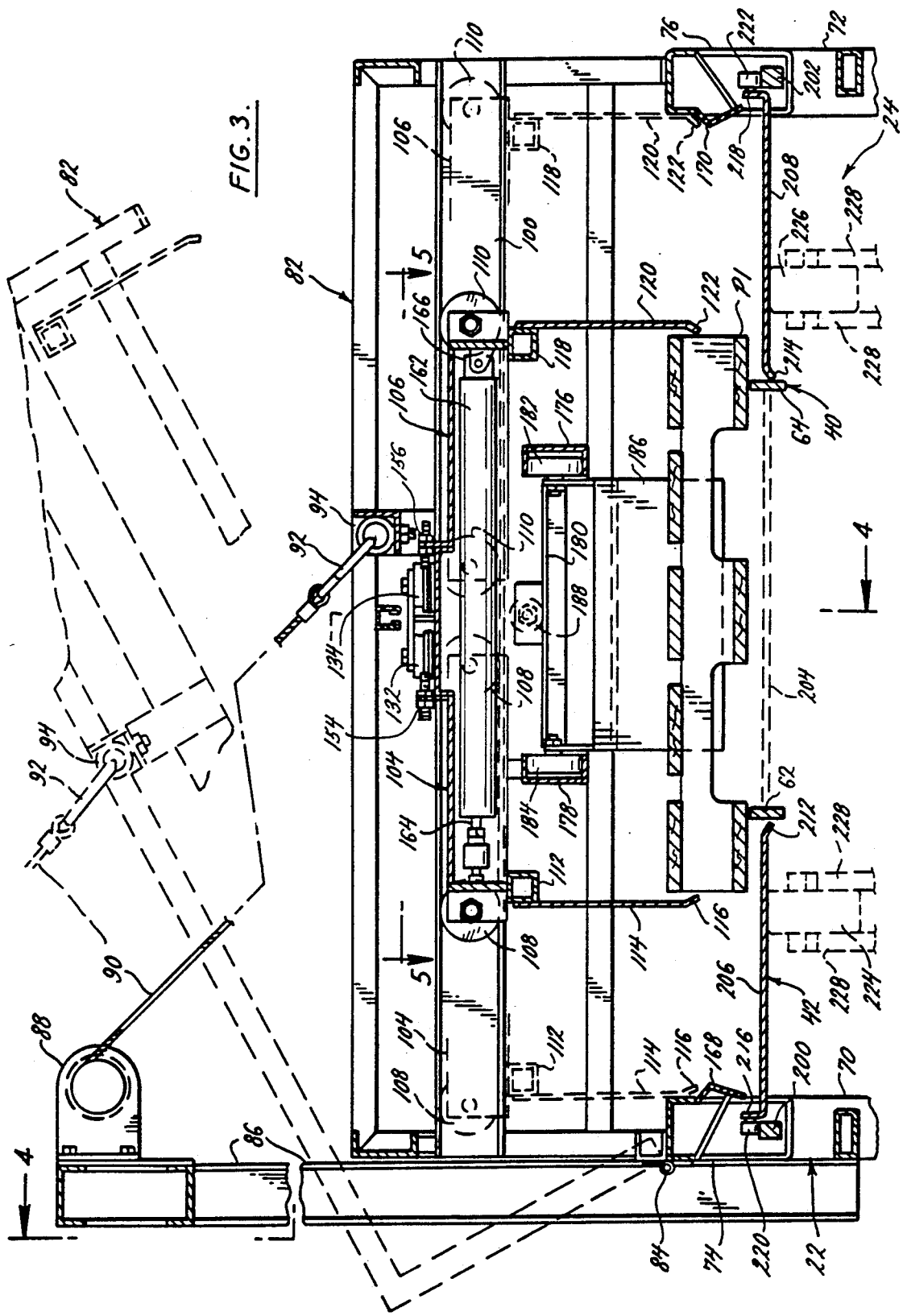
FIG. 3 is an enlarged view in section taken along the plane of the line 3—3 of FIG. 2.

The elevator 40 comprises spaced fork members 62 and 64, as shown in FIG. 3, each reinforced by a suitable gusset 66 (FIG. 2), and both depending from a channel member 68 (FIG. 2). The conveyor system 38 includes a section 69 within the infeed bay 24 and below the elevator 40 that is arranged so that the fork members 62 and 64 can pass through unimpeded areas allowing the elevator 40 to move to a position just below the conveyor section 69 and from that position to move upwardly. This conveyor section 69 is like the conveyor section illustrated in FIG. 16 to be described in conjunction with the outfeed bay 28.

The frame 22 also includes upright members 70 and 72 (FIGS. 2 and 3) at a side of the infeed bay 24. The upright members 70 and 72 support horizontally-extending beams 74 and 76 of special configuration. The beams 74 and 76 extend the length of the frame 22 and at their opposite ends, are supported by vertical members 78 and 80 (FIG. 11). The beams 74 and 76 support an overhead sub-frame and lifting system 82. The overhead sub-frame and lifting system 82 is connected by hinges 84 to the beam 74. A stanchion 86 that is connected to the beam 74 supports a winch 88, and a cable 90 that is wound on the winch 88 has an end loop 92 connected to an eye 94 on the sub-frame 82. Thus, when the the winch 88 is operated, the cable 90 can pivot the sub-frame 82 from the solid line position to the dotted line position as illustrated in FIG. 3 in the event a part needs repair or a pallet becomes jammed.

The sub-frame and lifting assembly 82 has a pair of parallel transversely-extending channel members 100 and 102 opening toward one another. A pair of alignment and centering plate assemblies 104 and 106 are mounted on wheels 108 and 110, respectively, that ride within the channel members 100 and 102. These wheels 108 and 110 allow the alignment and centering plate assemblies 104 and 106 to move between the solid line positions and the dotted line positions illustrated in FIG. 3 into and away from engagement with the side edges of a pallet P1.

The alignment and centering plate assembly 104 includes a longitudinal support member 112 to which a vertical plate 114 is welded. The lower edge 116 of the vertical plate 114 is turned inwardly. Likewise, the alignment and centering plate assembly 106 includes a support member 118 to which a vertical plate 120 is welded. The lower end 122 of the plate 120 is turned inwardly.

Figure 4:
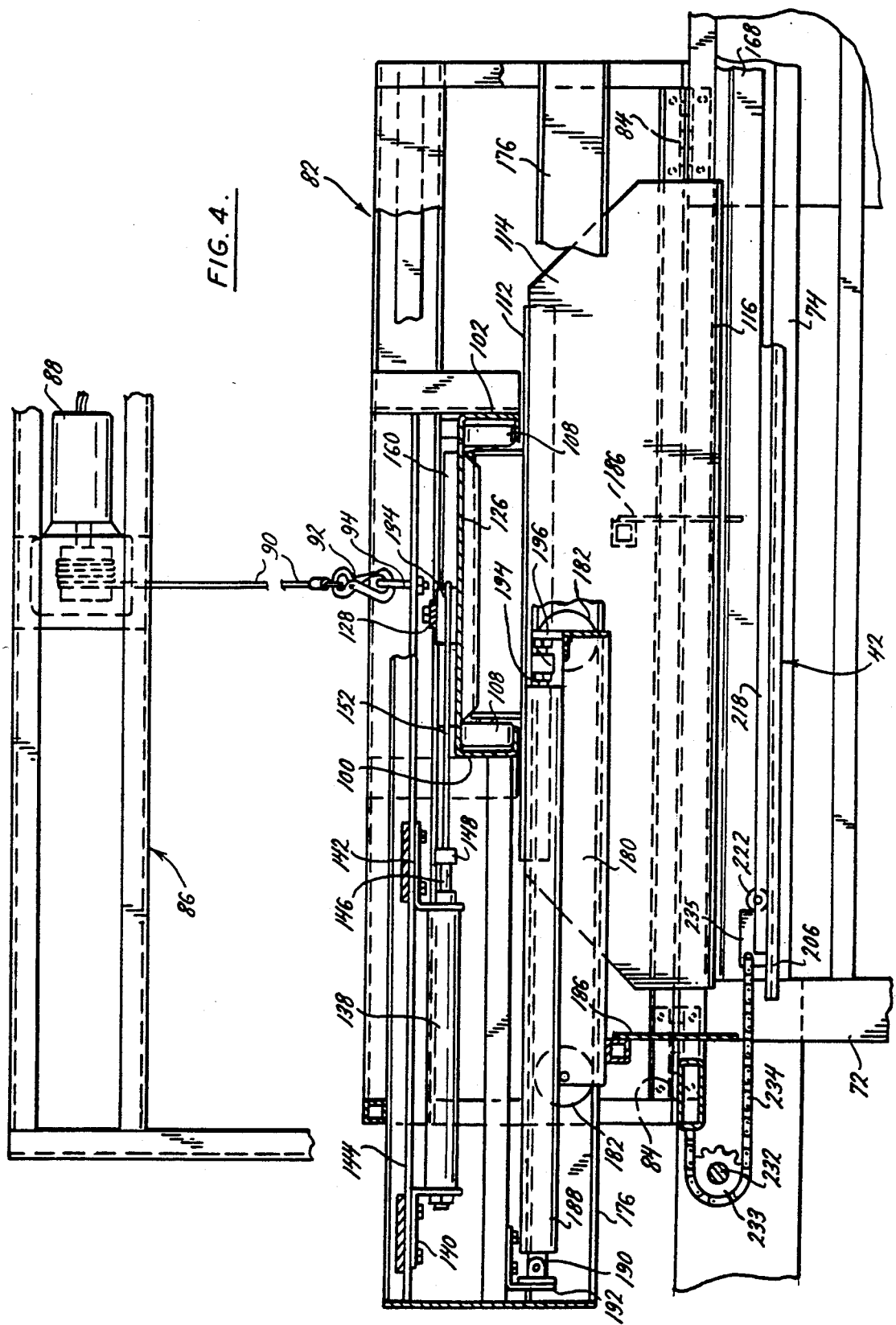
FIG. 4 is a view in section taken along the plane of the line 4—4 of FIG. 3.

As shown in FIGS. 4 and 6, a plate 126 is welded between the transverse channel members 100 and 102. A sprocket wheel retainer 128 is welded to a vertical spacer 130 that in turn is welded to the plate 126. A pair of sprocket wheels 132 and 134 are rotatably mounted on pins 136 that extend between the plate 126 and the sprocket wheel retainer 128.

An air cylinder 138 is mounted by brackets 140 and 142 to a plate 144 that is a fixed member of the subframe 82. The air cylinder 138 has a piston end 146 that is connected to a small plate 148. The ends of two chains 150 and 152 are connected to the small plate 148. The chains 150 and 152 extend around the sprocket wheels 132 and 134 and their opposite ends are connected by suitable fasteners 154 and 156, respectively, to upstanding flanges 158 and 160 on the respective alignment and centering plate assemblies 104 and 106.

The air cylinder 138 and its associated chains 150 and 152 can operate to draw the alignment and centering plate assemblies 104 and 106 transversely inwardly from the dotted line positions to the solid line positions illustrated in FIG. 3. Since the cylinder 138 and sprocket wheels 132 and 134 are in fixed positions relative to the longitudinal center of the frame 22, the alignment and centering plate assemblies are moved relative to the longitudinal center of the frame 22. Because both chains 150 and 152 are pulled by a single element (the piston 146), the plates 114 and 120 are always automatically centered equidistant from the longitudinal plane occupied by the cylinder 138.

To initially draw the alignment and centering plate assemblies 104 and 106 into gripping positions, another air cylinder 162 is provided. The air cylinder 162 has opposed piston ends 164 and 166 connected to the alignment and centering plate assemblies 104 and 106, respectively. Since nothing else supports the air cylinder 162, it floats with the plate assemblies 104 and 106. When air is discharged from the cylinder 162, the piston ends 164 and 166 are retracted to draw the plates 114 and 120 inwardly. When charged with air, the air cylinder 162 extends its pistons 164 and 166 to spread the plates 114 and 120 to the dotted-line positions illustrated in FIG. 3.

It should be noted that in these dotted-line positions, the inturned lower edges 116 and 122 of the vertical plates 114 and 120 are protected by bumpers 168 and 170 on the beams 74 and 76. These bumpers 168 and 170 assure that any pallet, regardless of how misaligned it may be, must be located inward of the inturned lower edges 116 and 122 of the alignment plates 114 and 120.

Figure 5:
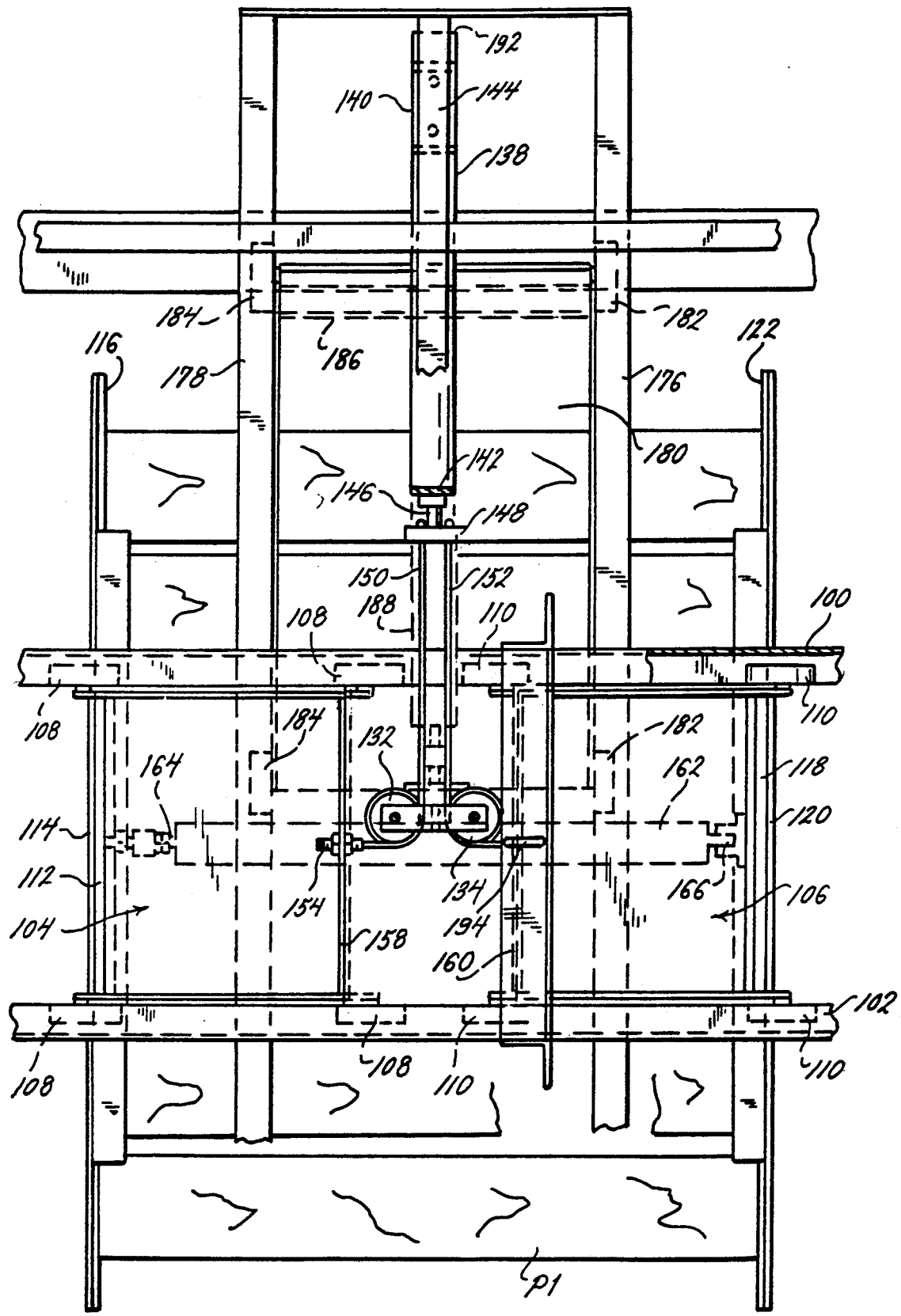
FIG. 5 is a view in section taken along the plane of the line 5—5 of FIG. 3.

A pair of longitudinal, inwardly-facing, parallel channel members 176 and 178 are supported by the subframe 82. A pusher plate carriage 180 is mounted on wheels 182 and 184 that ride within the channel members 176 and 178, respectively. The carriage 180 (see FIGS. 3 and 5) supports a vertically, downwardly-depending pusher plate 186. An air cylinder 188 (FIG. 4) has an end 190 connected by a bracket 192 to the sub-frame 82. The piston end 194 of the air cylinder 188 is connected by a bracket 196 to the carriage 180. The air cylinder 188 can be operated to move the pusher plate 186 from the solid-line position to the dotted-line position, both shown in FIG. 4, and to return the pusher plate 186 to the solid-line position.

As shown in FIG. 3, there are tracks 200 and 202 supported within the longitudinal beams 74 and 76. The pallet transfer car assembly 42 comprises a cross member 204 extending between spaced longitudinal plates 206 and 208. The longitudinal plates 206 and 208 have downturned inner edges 212 and 214, respectively, and the space between the edges 212 and 214 is just wide enough to allow passage of the elevator fork members 62 and 64, as shown in FIG. 3.

The transverse plates 206 and 208 have upwardly turned outer flanges 216 and 218, respectively, by which rollers 220 and 222 are rotatably supported. The rollers 220 and 222 ride on the tracks 200 and 202, respectively, allowing the pallet transfer car 42 to move longitudinally between the infeed bay 24 and the inspection bay 26.

As shown in FIG. 3 and indicated in FIG. 2, there are rollers 224 and 226 journalled in frame members 228 that are supported by the frame 22 beneath the longitudinal plate members 206 and 208 to support the plate members 206 and 208. The rollers 224 are adjacent the leading edges of the longitudinal plate members 206 and 208 when the pallet car assembly is over the infeed bay 24, as illustrated in FIG. 2.

The pallet car assembly 42 is driven by a motor 229 (see FIG. 2) having an output sprocket chain 230 that turns a sprocket wheel 231 mounted on a shaft 232. Another sprocket wheel 233 is mounted on the shaft 232 and a sprocket chain 234 is driven by the sprocket wheel 233 when the motor 229 is operated. A suitable connector 235 connects the sprocket chain 234 to the pallet cart 42.

Turning now to the inspection bay 26, the elevator 46 is supported on columns 236 that are part of the frame 22. The elevator 46 is moved vertically up or down by a motor driven chain assembly (not shown). The elevator 46 is like the elevator 40 in that it has two parallel forks 238 and 240 with reinforcing gusset plates 242 and 244 (see FIG. 15). As shown in FIGS. 14 and 15, the conveyor assembly 48 includes a receiving conveyor 246 separated from a discharge conveyor 248 and from idler bars 250 to leave spaces within which the forks 238 and 240 of the elevator 46 can pass. This allows the elevator 46 to move to a position below the level of the conveyor system 48, as shown in FIG. 15.

Referring to FIG. 8, at the top of the inspection bay 26, the frame 22 supports upright beams 254 and 256 that have brackets 257 welded adjacent their lower ends and that are connected together at their upper ends by a transverse stabilizing channel member 258. The upright beams 254 and 256 support two pneumatic gripper assemblies 260 and 262. These pneumatic gripper assemblies are identical to one another and, in FIG. 8, are shown rotated ninety degrees relative to one another to illustrate their various components. However, in actual use, the pneumatic gripper assemblies 260 and 262 remain aligned and rotate together. Each pneumatic gripper assembly 260 and 262 comprises a stub shaft 264 rotatably journalled in bearings 266 and 268 that are mounted on the upright beams 254 and 256 and their brackets 257. Each stub shaft 264 extends through openings 272 in the longitudinal beams 74 and 76.

An elongated bar 274 is affixed to the end of each stub shaft 264. Each elongated bar 274 supports two guide bushings 276 at its opposite ends. A pin 278 is slidable within each guide bushing 276, and the pins 278 are welded to an elongated channel member 280, the face of which is wrapped with a sheet 282 of gripping material, such as rubber. Each channel member 280 and its associated gripper sheet 282 functions as a gripper bar assembly 283, as will be described.

Each pneumatic gripper assembly 260 and 262 also incorporates two air cylinders 284 and 286 having pistons 288 and 290, respectively, that bear against the elongated channel member 280. To extend the pistons 288 and 290, air can be supplied to the cylinders 284 and 286 by way of tubes 292 and 294 that are connected by a tee 296 to another tube 298 that extends through each stub shaft 264. A fitting 300 that allows rotation of the tube 298 connects an air hose 302 that leads from a source of compressed air (not shown).

The air system that extends the pistons 288 and 290 when air is supplied to the cylinders 284 and 286 will push the elongated gripper bar assemblies 283 inwardly to grip the side edges of a pallet P1. To withdraw the gripper bar assemblies 283, each pneumatic gripper assembly 260 and 262 incorporates two tension springs 306 and 308 to return the elongated gripper bar assemblies 283 to their outward positions when the air pressure is released. FIG. 10 illustrates a typical connection of these springs 306 and 308, showing that one end of each spring is connected to a pin 310 on the elongated channel member 280 and the other end of the spring is secured by a retainer 312 to the bar 274.

A drive assembly for the stub shafts 264 includes a motor and gear assembly 316 (see FIG. 9) supported by the post 256. A sprocket chain 318 driven by an output sprocket wheel 320 on the shaft of the motor 316 is wrapped about another sprocket wheel 322 on a shaft 324. Chains 326 and 328 are mounted on sprockets 330 and 332, respectively, that are mounted on the shaft 324. These chains are also wound about sprockets 334 and 336 on the stub shafts 264 of the pneumatic gripper assemblies 260 and 262, respectively.

In the outfeed bay 28, there are vertical columns 338 that support the elevator 52. The elevator 52 is of the same construction and has the same kind of drive as the elevators 40 and 46 and includes parallel fork members 339 and 340 connected to a transverse member 341 and with reinforcing gusset plates 342 for the respective fork members 339 and 340. The transverse member 341 supports wheels 343 at its opposite sides that ride within grooves 344 in the vertical columns 338 (see FIG. 13). A chain 345 driven by a motor (not shown) is connected to the transverse member 341 by a suitable clamp 346 and extends about a sprocket wheel 348.

The conveyor assembly 54 in the outfeed bay 28 includes a central idler conveyor 350 and outer driven conveyors 352 with spaces that allow the fork members 339 and 340 to be lowered below the level of the conveyor assembly 54. Another conveyor 354 carries pallet stacks, such as the pallet stack PS7, away from the pallet inspection and stacking apparatus 20.

On opposite sides of the frame 22, there are longitudinal tracks 360 that extend between the inspection bay 26 and the outfeed bay 28. The tracks 360 support the pallet transfer car 50 that has rollers 362 that ride on the tracks 360. Like the pallet transport car 42, the pallet transport car 50 is formed with spaced longitudinal plates 364 and 366 having downturned inner edges 368 and 370, respectively, spaced far enough apart to permit the fork members 342 and 344 of the elevator 52 to fit between them. The pallet car 50 also has a cross member 372 that is beyond the ends of the fork members 342 and 344.

A sprocket chain 374 is connected to the pallet transport car 50 and is wrapped about sprocket wheels 376 and 378. The sprocket wheel 378 is driven by another sprocket chain 380 that can be moved in either direction by a reversible motor 382. When the motor 382 is operated in selected directions, it causes the pallet transport car 50 to move on the tracks 360 between a position overlying the inspection bay 26 and a position overlying the outfeed bay 28. (The tracks 360 are below the tracks 200 and 202 so that both pallet transfer cars 42 and 50 can be above the inspection bay 26 at the same time).

Figure 13:
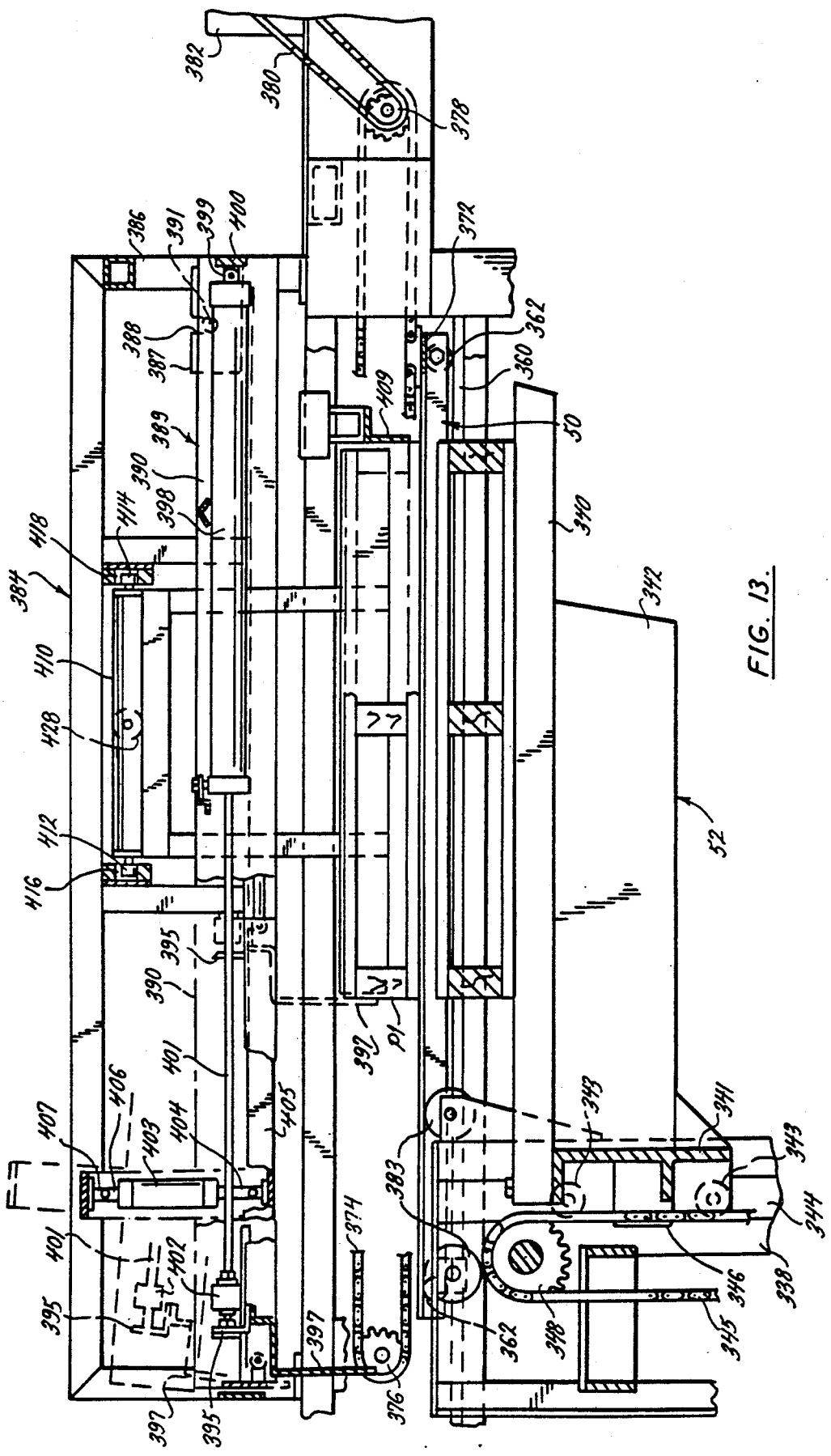
FIG. 13 is an enlarged view in section taken along the plane of the line 13—13 of FIG. 11.

Like the rollers 224 and 226 associated with the pallet transport cart 42, the pallet transport cart side plates 364 and 366 are supported by suitable rollers 383, as shown in FIG. 13, that in turn are supported by the frame 22.

An overhead frame 384 is supported by the main frame 22 above the outfeed bay 28. The overhead frame includes horizontal members 385 that reinforce two vertical columns 386 to which a pair of small plates 387 are welded. As shown in FIG. 13, each plate 387 has an upwardly opening slot 388. A sub-frame 389 has side members 390 to which stub shafts 391 are mounted for pivotal support within the slots 388. A pair of horizontal cam tracks 392 are formed by spaced horizontal guides 393 and 394 welded to the inner faces of the side members 390. A pusher plate frame 395 is supported on cam followers 396 that ride in the horizontal cam tracks 392. A downwardly extending pusher plate 397 is welded to the pusher plate frame 395.

An elongated air cylinder 398 has a clevis end 399 pivotally connected to a pivot mount 400 on the overhead frame 384. The air cylinder 398 extends longitudinally from the pivot mount 400 and has a piston rod 401 connected through a linear alignment coupling 402 to the pusher plate frame 395. Upon operation of the air cylinder 398, the pusher plate 397 is movable between the solid line and dotted line positions shown in FIG. 13 to push a pallet P1 to the right as viewed in FIG. 13.

In addition, as shown in FIG. 13, the sub-frame 389, carrying the pusher plate frame 395, the pusher plate 397, and the air cylinder 398, can be swung from the solid line positions to the dotted line positions about the stub shafts 391. This raises the pusher plate 397 high enough to allow a pallet on the car 50 to pass beneath the pusher plate 397. This pivotal movement is achieved by two air cylinders 403, each of which has a lower piston end 404 pivotally connected to an angle member 405 that is part of the overhead frame 384. The upper ends 406 of the air cylinders 403 are pivotally connected to clevis mounts 407 connected to a cross plate member 408 that is part of the sub-frame 389. Actuation of the air cylinders 403 alternatively extends and retracts the piston ends 404 to swing the sub-frame 389 about the stub shafts 391.

As shown in FIG. 13, a fixed stop 409 is welded to the overhead frame 384. The fixed stop 409 extends transversely slightly above the pallet transport car 50 in the path of a pallet P1 pushed by the pusher plate 397. The stop 409 uniformly positions pallets successively pushed by the pusher plate 397 against the stop 409.

Referring particularly to FIGS. 11 and 12, the overhead frame 384 supports gripper carriages 410 and 411 generally on opposite sides of the frame 22. Each gripper carriage has rollers 412 and 414 (see FIG. 13) that ride in tracks 416 and 418, respectively, extending transversely. The gripper carriages 410 and 411 support downwardly depending gripper arms 420 and 422 having gripper arm cross members 424 and 426, respectively, that extend transversely immediately above the pallet transport car 50.

An air cylinder 428 has an end pivotally mounted to a bracket 430 on the overhead frame 384 and has a piston 432 connected to a cross member 434 on the gripper arm carriage 410. Another air cylinder 436 has an end pivotally connected to a bracket 438 on the overhead frame 384 and has a piston 440 connected to a member 442 of the gripper arm carriage 411. The air cylinders 428 and 436 operate to move the gripper arms 420 and 422 between the solid and dotted lines as illustrated in FIG. 12 to alternately grip and release a pallet P1 by engaging its side edges. The gripper arms 420 and 422 hold the pallet P1 while the car 50 slides from under the pallet P1 and is returned to the upper end of the inspection bay 26.

Operation

In the description of operation, it will be understood that electronic controls including photocells and/or limit switches and/or timers may be incorporated to provide automatic operation of the various components in the sequences described. These electronic controls are not shown or described because such description is not necessary to those skilled in the art.

In a typical installation of this pallet inspection and stacking apparatus, a conveyor 38 delivers a succession of stacks of pallets, represented by the stacks PS1, PS2 and PS3, to the infeed bay 24. The operation of the conveyor 38 may be manual or automatic and, if it is automatic, it may be controlled by suitable means, not shown, such as a photocell or limit switch that senses the position of the infeed elevator 40.

When a stack of pallets is to be transferred by the conveyor 38 to the elevator 40, the elevator 40 will be in its lowermost position. This will position it below the conveyor 69 so that a pallet stack can move from the conveyor 38 onto the conveyor 69 into a position immediately above the lowered elevator 40.

It should be noted that the pallet stacks may typically consist of pallets that are misaligned and askew rather than being aligned. This misalignment can be because the pallets are shifted as well as rotated relative to one another as generally illustrated in FIG. 2.

When the pallet stack PS4 is above the elevator 40, a photocell or limit switch (not shown) energizes the elevator motor (not shown). The elevator 40 is raised to lift the pallet stack PS4 from the conveyor 69 and raise the stack. When the uppermost pallet of a pallet stack, such as the pallet P1 of the pallet stack PS4, reaches a position that is slightly higher than the longitudinal plates 206 and 208 of the pallet car assembly 42, automatic sensing means (not shown) cause the elevator 40 to stop and cause the cylinder 162 to be actuated to draw the alignment and centering plate assemblies 104 and 106 toward one another. Consequently, the plates 114 and 120 are brought into contact with the pallet P1.

If the pallet is not centered, initially only one plate will contact the pallet. Because the cylinder is only connected to the plates, it floats, and continued actuation of the cylinder draws the other plate 114 or 120 into contact with the opposite side of the pallet. During this process, if the pallet P1 is askew, or rotated out of alignment with the longitudinal axis of the apparatus 20, the pressure applied by the plates 114 and 120 will rotate the pallet P1 and align it, although the pallet may remain to one side of center. The last, resulting from the floating cylinder 162, is to minimize sliding contact between pallets which, because of wood slivers, loose nails and the like, could cause the pallets to jam together.

When the plates 114 and 120 have been drawn tightly against the pallet P1, a sensor (not shown) causes the elevator to be lowered to establish a slight gap (about ⅛ inch) between the top of the pallet stack PS4 and the pallet P1. Thereupon, a sensor (not shown) triggers actuation of the cylinder 138 to withdraw the piston 146, pulling on the two chains 150 and 152 simultaneously. This draws the alignment and centering plate assemblies 104 and 106 inwardly, causing the vertical plates 114 and 120 to move into alignment with the longitudinal center of the apparatus 20.

The pallet is therefore quickly aligned longitudinally because the chains 150 and 152 are drawn toward the cylinder 138 causing the plates 114 and 120 to be drawn equally toward the longitudinal center of the frame 22.

At this time a control (not shown) energizes the motor 229 to drive the pallet car assembly 42 from the position it had occupied above the inspection bay 26 to the left to a position overlying the infeed bay 24. This is the position shown in FIG. 2. When the pallet car assembly 42 reaches that position, a sensor (not shown) operates an air cylinder 138 to release the tension on the chains 150 and 152 and operates the air cylinder 162 to drive its pistons 164 and 166 outwardly, spreading the alignment and centering assemblies 104 and 106 outwardly, releasing the pallet P1. Upon release, the pallet P1 drops to rest on the longitudinal plates 206 and 208 of the pallet car assembly 42.

Upon dropping of the pallet P1, a control (not shown) causes actuation of the cylinder 188 to push the carriage 180 and the pusher plate 186 from the solid line position toward the dotted line position illustrated in FIG. 4, thereby sliding the pallet P1 on the pallet car 42 to a predetermined position. At this time a sensor (not shown) causes the motor 229 to be energized to drive the pallet car assembly 42 to the right as viewed in FIG. 2 moving to a position above the inspection bay 26.

When the pallet P1 reaches the position between the gripper bar assemblies 283, as shown in FIG. 8, a sensor (not shown) causes air to be delivered through the tubes 302 and the stub shafts 264 to the cylinders 284 and 286 associated with both pneumatic gripper assemblies 260 and 262. This extends the pistons 288 and 290, extending the mutually aligned gripper arm assemblies 283 inwardly to grip the side edges of the pallet P1. As the gripper arm assemblies 283 hold the pallet, the pallet car assembly 42 is moved back to overlie the infeed bay 24 to receive another pallet as previously described. Likewise, the pallet car assembly 50 is transported to overlie the outfeed bay 28. Meanwhile during this procedure, an operator standing on the platform 30 can observe the condition of the top of the pallet P1.

At this point, in response to an appropriate sensing means (not shown), the motor 316 is energized to drive the sprocket chain 318 and rotate the shaft 324. Rotation of the shaft 324 drives the sprocket chains 326 and 328 simultaneously to rotate the stub shafts 264 of both pneumatic gripper assemblies 260 and 262. The motor 316 is controlled (by conventional means, not shown) to rotate the pallet P1 through 180°, exposing its bottom side for viewing by the operator. This allows the operator to inspect the condition of the pallet P1 on the bottom after having inspected the top. If the operator deems the pallet P1 to be acceptable, he does not interrupt the automatic operation of the machine.

However, if the operator determines that the pallet P1 should be rejected, he operates an appropriate button (not shown) on one of the controls 34 to release the air pressure from the cylinders 284 and 286. This allows the tension springs 306 and 308 to withdraw the gripper arm assemblies 283 and release the pallet P1. At this time, the pallet P1 will be released onto the elevator 46 or the top of a stack PS5 of pallets that are resting on the elevator 46.

Whenever a new pallet P1 is added to the stack PS5 on the elevator 46, a control means (not shown) indexes the elevator 46 downwardly by the height of a pallet. When a sensor (not shown) indicates the elevator 46 has received a full stack of pallets PS5, the elevator 46 is lowered until its fork members 238 and 240 are slightly below the conveyor 246, as shown in FIG. 15. When this happens, the conveyor 246 will discharge the pallet stack PS5 onto the conveyor 248 and the pallet stack PS5 will be conveyed away from the machine for repair of the damaged pallets. The repaired pallets can then be returned to the delivery conveyor assembly 38 to proceed through the apparatus 20 again.

If the pallet P1 was not rejected by the operator, the motor 316 will automatically cause the gripper arm assemblies 283 to rotate through another 180°, returning the pallet P1 to its original orientation. At that time, an appropriate sensor (not shown) energizes the motor 382 to transfer the pallet car assembly 50 to the left as viewed in FIG. 2 from its position above the outfeed bay 28 into position adjacent the top of the inspection bay 26, below the pallet P1 held by the gripper arm assemblies 283.

Then, a sensor (not shown) causes the air pressure to be released from the cylinders 284 and 286, allowing the springs 306 and 308 to withdraw the gripper bar assemblies 283 outwardly to release the pallet P1, which falls onto the pallet car assembly 50. The pallet car assembly 50 then transfers the pallet P1 to the right to a position generally over the outfeed bay 28. At this point, the pallet P1 is not in the correct position over the outfeed bay 28 because the pallet car assembly 50 cannot move far enough. As the pallet car assembly moves between the inspection bay 26 and the outfeed bay 28, the pusher plate 397 and its frame 389 are held up in the dotted line position illustrated in FIG. 13. However, when the pallet car assembly 50 carrying the pallet P1 reaches the position generally above the outfeed bay 22, a sensor (not shown) operates the air cylinders 403 to lower the pusher plate 397 to the solid line position illustrated in FIG. 13 and operates the cylinder 398 to draw the pusher plate 397 to the right as viewed in FIG. 13.

Meanwhile, a sensor (not shown) causes the transfer car 42 to be moved from the infeed bay to the inspection bay. Once the pallet car assembly 42 has vacated the area above the infeed bay 22, the sensor and drive mechanism (not shown) for the elevator 40 can index the elevator 40 upwardly to position the next pallet P2 slightly above the plane of the pallet car assembly 42. This locates the pallet P2 in position for a repeat of the operation just described.

The pusher plate 397 engages the pallet P1 and pushes the pallet P1 against the fixed stop 409, thereby accurately setting the position of the pallet P1 above the outfeed bay 28. When the pallet P1 reaches this position, a suitable sensor (not shown) operates to supply air to the air cylinders 428 and 436 (see FIG. 12) to move the gripper arms 420 and 422 inwardly for gripping the side edges of the pallet P1. With the pallet P1 thus gripped, the pallet car assembly 50 can be withdrawn as is triggered by an appropriate sensor (not shown).

After the pallet car assembly 50 is withdrawn into the position overlying the inspection bay, the sensor (not shown) causes the cylinders 428 and 436 to operate to spread the gripper arms 420 and 422 outwardly and thereby release the pallet P1. Upon release, the pallet P1 falls onto the elevator 52 or onto the top of a pallet stack PS6 that is resting on the elevator. All of the pallets on the stack PS6 will be properly aligned.

As the elevator 52 is loaded with accepted pallets, the stack PS6 increases in height. Each pallet added to the stack is sensed by means, not shown, resulting in the downward indexing of the elevator 52 by the height of a pallet. When the elevator 52 has a full load of pallets in a stack PS6, as sensed by a suitable sensing means (not shown), the elevator 52 is lowered until it is below the conveyor assembly 54. This allows the pallet stack PS6 to be removed onto the conveyor 354 to be carried away from the apparatus.

The operation of the pallet inspection and stacking apparatus 20 has been described in connection with the inspection mode and alignment. The inspection can be by-passed and the machine 20 can be used solely for aligning and re-stacking a group of pallets that are in a misaligned stack, such as the pallet stack PS4 illustrated in FIG. 2 in the infeed bay 24. In this operation, all sequences of operation are as before except that the pallet need not be rotated by the pallet gripping and holding system 45.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A pallet handling apparatus comprising: a main frame having an upper end and a lower end; first elevator means for transporting pallets from the lower end to the upper end; second elevator means for transporting pallets from the upper end to the lower end; a pallet inspection apparatus supported adjacent the upper end of the main frame, the pallet inspection apparatus incorporating means for gripping edges of a pallet of the kind having upper and lower sides and inverting the pallet for successive exposure of the upper and lower sides to enable inspection thereof, and for selectively separating pallets that pass inspection from pallets that do not pass inspection; first means for transferring a pallet along a substantially direct path of transfer from the first elevator means to the pallet inspection apparatus; and second means for transferring a pallet from the pallet inspection apparatus to the second elevator means, wherein the means for gripping and inverting inverts the pallet while the pallet remains in the path of transfer.

2. The pallet handling apparatus of claim 1 wherein the second elevator means is below the pallet inspection apparatus, and the second means for transferring a pallet from the pallet inspection apparatus to the second elevator means comprises means for releasing the pallet gripping means to drop a pallet toward the second elevator means.

3. The pallet handling apparatus of claim 1 wherein the second elevator means is positioned transverse of the pallet inspection apparatus, and the apparatus includes means to index the second elevator means downwardly as pallets are delivered to it by the second means for transferring a pallet from the pallet inspection apparatus to the second elevator means.

4. The pallet handling apparatus of claim 3 including third elevator means positioned below the pallet inspection apparatus for transferring selected pallets from the pallet inspection apparatus to the lower end of the frame.

5. The pallet handling apparatus of claim 1 wherein the means for gripping a pallet comprises a pair of gripper arms disposed in initial positions on opposite sides of a pallet transferred to the pallet inspection apparatus and spaced from the edges of the pallet, means for moving the gripper arms toward one another to engage the edges of the pallet, means for rotating the arms to rotate the pallet, and means for returning the arms to their initial positions.

6. The pallet handling apparatus of claim 5 including means for sequencing the rotating means in two cycles of about 180° of rotation each with a pause between the cycles.

7. The pallet handling apparatus of claim 5 including a pair of bars corresponding to the respective arms, each bar being mounted on a shaft, means on the main frame for rotatably supporting the shafts, wherein the means for moving the gripper arms comprises cylinder and piston assemblies connected between each bar and a respective arm, fluid pressure means for transferring fluid to the cylinders to extend the pistons to move the gripper arms, and the returning means comprises tension spring means for retracting the pistons when the fluid pressure means is released.

8. The pallet handling apparatus of claim 4 including conveyor means for delivering pallets to the first elevator means, conveyor means for carrying pallets from the second elevator means, and conveyor means for carrying pallets from the third elevator means.

9. The pallet handling apparatus of claim 8 wherein each conveyor means has a transfer area in the path of its respective elevator means, each elevator means comprises spaced fork members for supporting at least one pallet, and each transfer area has means defining spaces permitting passage of the fork members below the transfer area to enable transfer of pallets between each conveyor means and its respective elevator means.

10. The pallet handling apparatus of claim 1 including means adjacent the upper end of the main frame for aligning a pallet prior to transfer of the pallet to the pallet inspection apparatus.

11. The pallet handling apparatus of claim 10 wherein the aligning means comprises a pair of alignment plates supported by the main frame above the first elevator means aligned with and spaced on opposite sides of the path of transfer of a pallet by the first transferring means, and means for moving the alignment plates into engagement with opposed edges of a pallet to align and center the pallet, and means for separating the alignment plates from the pallet edges.

12. The pallet handling apparatus of claim 11 wherein the moving means includes two cables or chains each having one end connected to a respective alignment plate, a single retractor means, the cables or chains having second ends connected to the retractor and having intermediate areas extending around pulleys to orient toward one another, sections of the cables or chains adjacent the respective ends wherein actuation of the retractor means draws the alignment plates toward one another.

13. The pallet handling apparatus of claim 12 wherein the moving means and the separating means includes a cylinder and piston assembly connected between the alignment plates.

14. The pallet handling apparatus of claim 12 wherein the alignment plates are supported by wheels, and channel members on the main frame within which the wheels are confined.

15. The pallet handling apparatus of claim 10 including a pusher, means to actuate the pusher to push a pallet into a predetermined position relative to the first transferring means.

16. The pallet handling apparatus of claim 15 wherein the first transferring means comprises designated plate means for receiving a pallet and the pusher is located to push a pallet resting on the plate means.

17. The pallet handling apparatus of claim 15 including an overhead frame above the main frame for supporting the means to actuate the pusher and the pusher, and means to raise the overhead frame relative to the main frame to provide access to the main frame.

* * * * *